US007050313B2

(12) United States Patent
Huang et al.

(10) Patent No.: US 7,050,313 B2
(45) Date of Patent: May 23, 2006

(54) AIRCRAFT AC-DC CONVERTER

(75) Inventors: Hao Huang, Troy, OH (US); Victor B. Bonneau, Dayton, OH (US); David D. Karipides, Casstown, OH (US); Anthony G. Koesters, Dayton, OH (US)

(73) Assignee: Smiths Aerospace LLC., Grand Rapids, MI (US)

( * ) Notice: Subject to any disclaimer, the term of this patent is extended or adjusted under 35 U.S.C. 154(b) by 17 days.

(21) Appl. No.: 10/770,532

(22) Filed: Feb. 4, 2004

(65) Prior Publication Data

US 2005/0169025 A1    Aug. 4, 2005

(51) Int. Cl.
*H02H 7/00* (2006.01)
*H02M 7/155* (2006.01)

(52) U.S. Cl. .......................... 363/54; 363/128; 363/85
(58) Field of Classification Search ................. 363/54, 363/128, 85, 160, 161
See application file for complete search history.

(56) References Cited

U.S. PATENT DOCUMENTS

| | | | | |
|---|---|---|---|---|
| 2,892,098 A | | 6/1959 | Bergvall | |
| 3,593,106 A | * | 7/1971 | Lafuze | 363/161 |
| 3,609,509 A | * | 9/1971 | Lafuze | 363/161 |
| 3,678,369 A | * | 7/1972 | Splatt | 363/161 |
| 3,852,654 A | * | 12/1974 | Gyugyi et al. | 363/161 |
| 4,105,897 A | * | 8/1978 | Stratton et al. | 307/3 |
| 4,225,911 A | | 9/1980 | Carlson | |
| 4,587,436 A | | 5/1986 | Cronin | |
| 4,620,296 A | * | 10/1986 | Siemon | 363/51 |
| 5,175,676 A | * | 12/1992 | Kikuchi | 363/58 |
| 5,541,830 A | | 7/1996 | Moore et al. | |
| 5,969,959 A | * | 10/1999 | Odegard et al. | 363/51 |
| 6,822,883 B1 | * | 11/2004 | Dahler et al. | 363/58 |
| 2003/0137855 A1 | | 7/2003 | Miguchi | |
| 2003/0142529 A1 | | 7/2003 | York | |

* cited by examiner

Primary Examiner—Bao Q. Vu
(74) Attorney, Agent, or Firm—Foley & Lardner LLP

(57) ABSTRACT

An AC-DC converter includes a DC reference voltage generation unit that creates a DC reference voltage waveform based in part on a feedback signal. The AC-DC converter also includes an SCR firing unit that receives a variable frequency power output from the generator and that provides firing signals. The AC-DC converter further includes SCRs arranged as a positive bank of SCRs and a negative bank of SCRs. The AC-DC converter further includes a modulator unit that receives the firing signals and the DC reference voltage waveform, and that respectively outputs SCR gate signals to the SCRs. The AC-DC converter also includes a filter unit provided between the positive and negative banks of SCRs. The AC-DC converter also includes a voltage feedback path for feeding back the DC output voltage as the feedback voltage waveform.

26 Claims, 10 Drawing Sheets

AIRCRAFT AC-DC CONVERTER

BACKGROUND OF THE INVENTION

A. Field of the Invention

The invention relates generally to an ac-dc converter, and in particular it relates to an aircraft ac-dc converter that utilizes a cycloconverter to provide DC power for aircraft components that require DC.

B. Description of the Related Art

Variable speed constant frequency (VSCF) power generation systems are known in the aircraft power systems art for powering aircraft components. Some VSCF systems include a cycloconverter, which is a known component in the aircraft power systems art for providing AC power for an aircraft.

VSCF systems also typically include a generator machine that provides a variable speed power that is input to a frequency conversion portion (e.g., cycloconverter) of a VSCF system. One such generator machine that can generate variable frequency power for a VSCF system corresponds to a three-synchronous machine set. The three-synchronous machine set includes a main generator (MG), an exciter (EXC), and a permanent magnet generator (PMG).

Aircraft generators are typically driven by variable-speed aircraft engines, such as, for example, turbo-jet, turbo-fan, and propeller-fan engines. In such systems, the engine speed varies over the ground/flight envelope, whereby an aircraft may be taking off at one flight time period, it may be cruising at another flight time period, and it may be landing at another flight time period. The engine rotational speed is likely to be different for each of these different flight time periods. When an aircraft engine drives the generator so as to provide torque to the generator, the generator turns at a variable speed corresponding to the current rotational speed of the engine. The generator outputs a variable frequency power based on the variable engine rotational speed.

The generator is coupled to the cycloconverter in a typical VSCF system. The cycloconverter demodulates a lower frequency waveform from a higher frequency waveform, and typically it includes a static power converter that has a plurality of silicon controlled rectifiers (SCRs). The lower synthesized AC waveform output of the SCRs is passed through a filter to yield the desired constant frequency power, which typically is a 400 Hz power signal for many conventional aircraft systems.

In order to generate a high quality 400 Hz power signal to be used to drive various aircraft components, the generator must turn at a high speed in order to produce a high enough frequency to be demodulated. Typically, the generator must turn at least three or four times higher than the 400 Hz power desired. Accordingly, the engine must turn at least 1200 to 1600 revolutions per minute.

Current aircraft designs are moving to more DC power, whereby a DC power system is needed instead of an AC power system. Several approaches have been presented in order to provide DC power from a VSCF system. As described in U.S. patent Publication 2003/0142529, while a cycloconverter system has the ability to produce both AC and DC simultaneously, it does not produce clean waveforms. For such systems, the voltage regulation is accomplished by a series of magnetic amplifiers, transformers, and bridge rectifiers. Accordingly, such systems for providing DC to aircraft components are not feasible in practice, since the unclean (i.e., noisy) waveforms result in poor aircraft component performance.

In another system for providing DC power from a VSCF system, as described in U.S. Pat. No. 4,587,436, a bridge rectifier is placed in the generator housing to rectify the three-phase variable-frequency AC power to a DC voltage, such as to 270 VDC. However, such systems require the inverting of a large percentage of the power for motor loads and for the large amount of 400 Hz equipment, thereby incurring significant weight requirements that are clearly disadvantageous for aircraft designs that operate under the maxim that "lighter is better."

The present invention is directed to overcoming or at least reducing the effects of one or more of the problems set forth above.

SUMMARY OF THE INVENTION

According to a first aspect of the invention, there is provided an AC-DC converter unit that is coupled to a generator, The AC-DC converter unit includes a DC reference voltage generation unit configured to create a DC reference voltage waveform based in part on a feedback signal. The AC-DC converter unit also includes an SCR firing waves unit configured to receive a variable frequency voltage output from the generator and to provide a plurality of firing signals. The AC-DC converter unit further includes a plurality of SCRs including a positive bank of SCRs and a negative bank of SCRs. The AC-DC converter unit still further includes a modulator unit configured to receive the firing signals from the SCR firing waves unit and the DC reference voltage waveform, and to respectively output a plurality of SCR gate signals to the plurality of SCRs, wherein an output of the plurality of SCRs corresponds to a rectified voltage waveform. The AC-DC converter unit also includes a filter unit provided between the positive and negative banks of SCRs, the filter unit configured to filter the rectified voltage waveform to provide a filtered rectified voltage waveform as a DC output voltage of the AC-DC converter. The AC-DC converter unit further includes a voltage feedback path for feeding back the DC output voltage as the feedback voltage waveform.

According to another aspect of the invention, there is provided an AC-DC converter unit that is constructed similar to the aspect described above, but whereby there are three sets of SCRs that are driven by a single control system.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

The present invention will be described in detail below, with reference to the accompanying drawings. The present invention relates to an AC-DC converter, and specifically to an AC-DC converter that can be used to power aircraft components that require DC.

A first embodiment of the present invention will be described below, with reference to an AC-DC converter that is constructed based on a conventional VSCF system. With such a construction, a conventional VSCF system can be readily modified to function as an AC-DC converter, thereby saving on manufacturing costs and qualification testing costs. For example, a conventional VSCF system that has been manufactured by the same assignee as this application and that has passed qualification testing for an aircraft will be described, whereby the changes made to that conventional VSCF system to provide an AC-DC converter according to a first embodiment of the invention will be described.

It is postulated that an AC-DC converter built according to at least one embodiment of the present invention will readily pass qualification testing based on the fact that it is basically a modified version of a VSCF system that has already passed qualification testing. One of ordinary skill in the art will recognize that the AC-DC converter according to the present invention may be used to power any type of aircraft that has one or more components that require DC power, and not just for a fighter jet aircraft.

Figure 1:
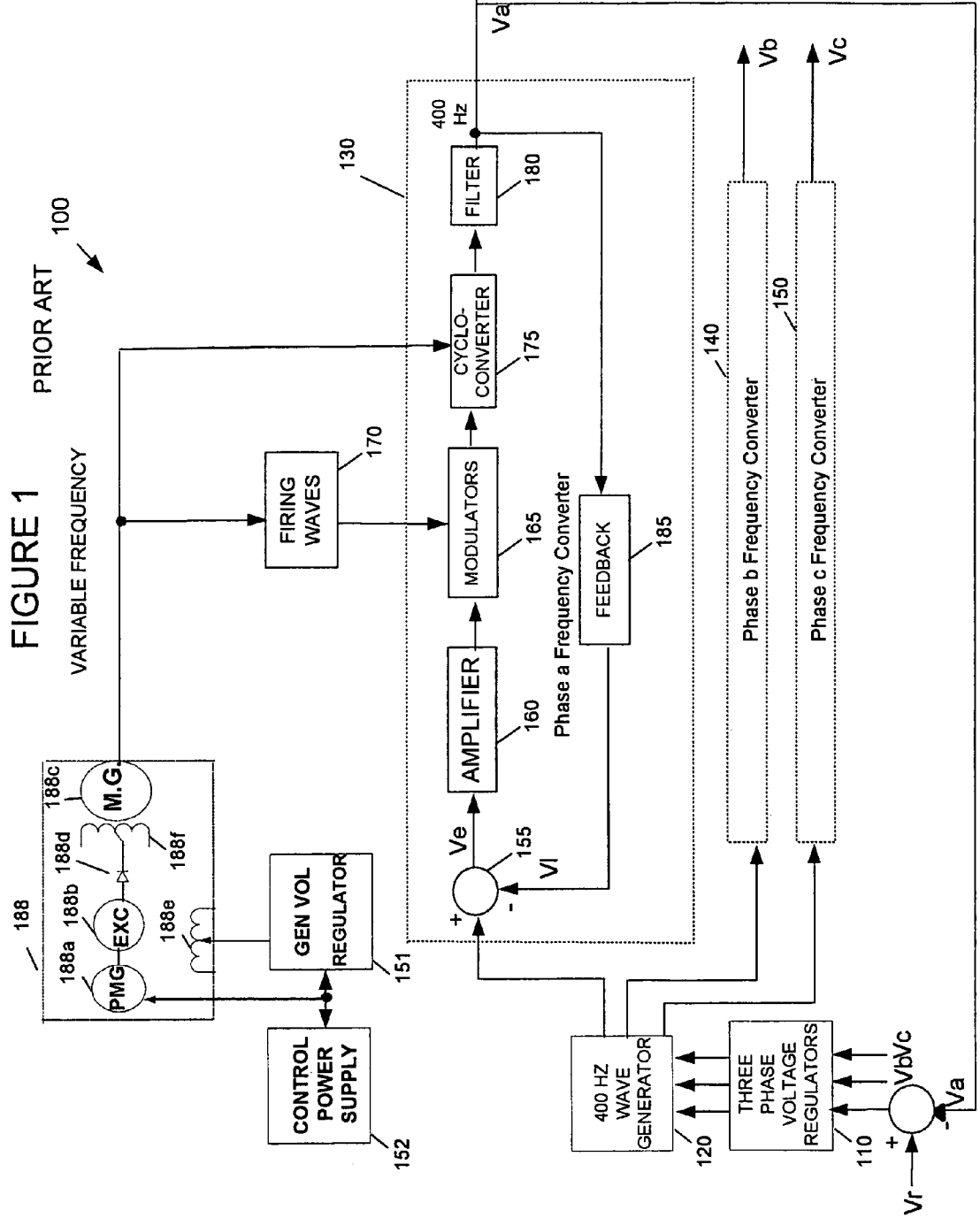
FIG. 1 is a block diagram of a conventional VSCF power generation system.

FIG. 1 is a block diagram of a conventional aircraft VSCF system. Such a conventional VSCF system is described in detail in U.S. Pat. No. 4,225,911, issued to Harold G. Carlson, which is incorporated in its entirety herein by reference.

The VSCF system 100 of FIG. 1 is a conventional three phase, 115 volt AC, 400 Hz, VSCF power generation system. Under normal operating conditions when a load is present with respect to the alternating current power signals, the voltage amplitude levels of these alternating current power signals are maintained at a preselected amplitude value range by a voltage regulation control loop made up of a three-phase voltage regulator unit 110, a 400 Hz wave generator unit 120, and phase a, b and c frequency converters 130, 140 and 150. Details of the phase-a frequency converter 130 are shown in detail, whereby it includes a subtractor (or comparator) 155, an amplifier 160, a modulators unit 165, a firing waves unit 170, a cycloconverter 175, a filter 180, and a feedback unit 185. The phase-b frequency converter 140 and the phase-c frequency converter 150 each have the same components as the phase-a frequency converter 130, and therefore those components are not shown in FIG. 1 so as to not obfuscate that figure.

As is shown in FIG. 1, each of the phase-a, -b and -c frequency converters 130, 140, 150 includes a filter and a cycloconverter. The cycloconverter 175 for the phase-a frequency converter 130 includes a plurality of SCRs (not shown), and provides as its output the alternating current power signal Va. Similarly, the cycloconverters for the phase-b and phase-c frequency converters 140, 150 provide at their respective outputs the alternating current power signals Vb and Vc.

Also shown in FIG. 1 is a three-set generator package 188, which includes a permanent magnet generator (PMG) 188a, an exciter (EXC) 188b, and a main generator (MG) 188c, along with a half-bridge rectifier 188d and transformer windings 188e, 188f. A control power supply unit 152 provides power to a voltage regulator 151, which in turn provides a regulated voltage to the exciter 188b. A rotation of an aircraft engine is typically used to provide a torque to the PMG 188a, which is used to "generate" variable frequency power to be provided to the cycloconverter 175. The cycloconverter 175 converts the variable frequency power to power at a predetermined frequency, such as to obtain a 400 Hz AC power signal.

A brief description of the operation of the generator package 188 will be provided herein. When the aircraft engine rotates, that rotation causes turning movement of the PMG 188a. The stator of the PMG 188a will thereby have a voltage on it due to the rotation of the magnets on the rotor, and that voltage will be provided to a stator of the exciter 188b which is disposed on the same housing frame of the PMG 188a. Accordingly, the rotor of the exciter 188b will have a voltage on it, and that voltage will be sent to the half-bridge rectifier 188d. The output of the half-wave-bridge rectifier (or full-wave bridge) 188d will power the rotor of the MG 188c, whereby this is commonly referred to as the excitation of the MG 188c.

The variable frequency output of the generator package 188 is input to the firing waves unit 170, which provides firing signals to the modulators unit 165 in order to obtain a fixed frequency output signal. The modulators unit 165 includes a plurality of modulators (not shown) that are fired at different respective times so as to provide a predetermined shape waveform to the cycloconverter 175, in a manner known to those skilled in the aircraft power systems art. The fixed-frequency AC voltage output of the cycloconverter 175, after being filtered by the filter 180 (which may correspond to a metal film capacitor, or a capacitor and an inductor circuit, in typical aircraft implementations), is fed back and subtracted from an output of the 400 Hz wave generator unit, by way of the subtractor 155. The output of the subtractor 155 is amplified by the amplifier 160 and provided to the modulators unit 165 as a signal-to-be-modulated, in accordance with the firing signals provided by the firing waves unit 170.

The three phase voltage regulator unit 110 provides a regulated voltage signal to the 400 Hz wave generator unit 120. The three phase voltage regulator unit 110 is described in detail in the Carlson patent. The detailed operation of a conventional VSCF system is known to those skilled in the aircraft power systems art, and is only discussed above briefly herein for the sake of brevity.

Figure 2:
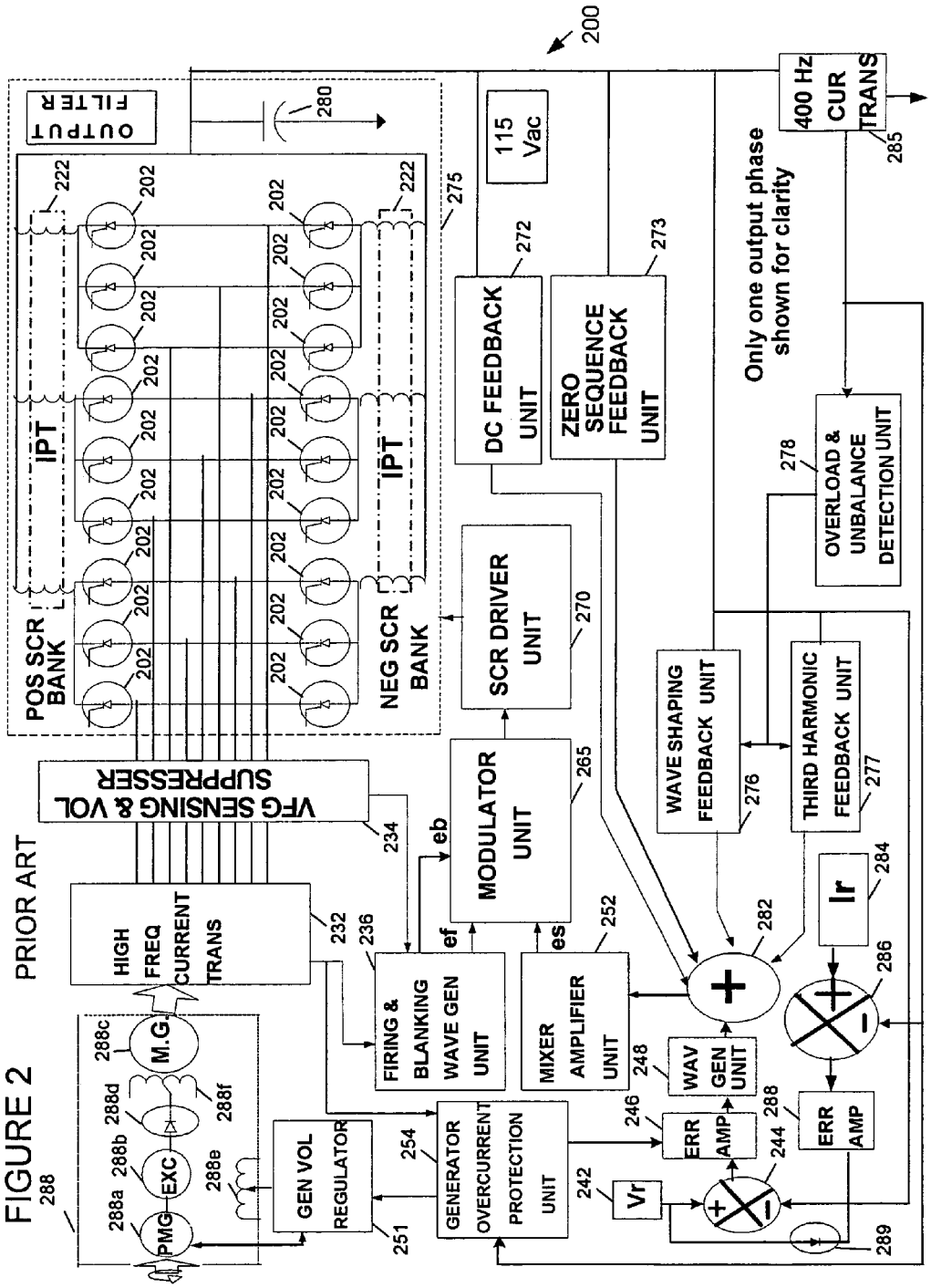
FIG. 2 is a more detailed block diagram of a conventional VSCF power generation system.

FIG. 2 shows a more detailed block diagram of a conventional 50/65 kVA, 115 VAC VSCF system 200 for use in an aircraft, such as for use in a military fighter jet. A nine-phase, variable frequency output of the main generator (MG) 288c is provided to three nearly identical frequency converter circuits that convert the variable frequency power (output from the MG 288c) to a constant 400 Hz, three-phase power. Only one frequency converter circuit is shown in block diagram form in FIG. 2, whereby the output of the MG 288c can be used to power each of the three nearly identical frequency converter circuits.

Each frequency converter circuit includes a plurality of SCRs (also referred to herein as "rectifiers") 202, whereby the number of SCRs utilized in the power stage of the cycloconverter 275 of each frequency converter circuit is 18 for many military jet aircraft implementations. Of course, one of ordinary skill in the aircraft power systems art will recognize that other numbers of SCRs may be utilized, such as 12 or 24, for use in a VSCF system. The smaller the number of SCRs used, the larger the capacitance of the filter (provided at the output of the plurality of SCRs 202) that is required.

The 18 SCRs are gated by modulators within a modulator unit 265, to form a 400 Hz output waveform. The modulator unit 265 compares a firing wave, ef, to a 400 Hz enhanced reference signal, es, whereby es is the sum of a 400 Hz reference waveform and an inner loop feedback signal. The firing wave ef is derived from the variable frequency output of the main generator MG 288c, as is known to those skilled in the aircraft power systems art. After the comparison is made, a power SCR gating sequence is output by the modulator unit 265 to the SCRs 202 by way of an SCR driver unit 270, to create a 400 Hz sinusoidal waveform.

The three three-phase, 400 Hz enhanced reference signals es of the respective three frequency converter circuits are phase-displaced 120 degrees with respect to each other, but in all other respects the three frequency converter circuits are identical to one another.

The output voltage of the VSCF system 200, which corresponds to the voltage across the capacitor (filter) 280 after having passed through a 400 Hz current transformer 285, is compared with the reference voltage waveform Vr by way of a negative feedback path, in order to reduce the output impedance of the VSCF system 200. Each frequency converter circuit, with its negative feedback path, operates as a high power amplifier, whereby it produces an output wave that is a replica of the signal wave es, but at a much higher power level.

In the SCR power stage of the cycloconverter 275, the upper nine (9) SCRs 202 in FIG. 2 correspond to a positive bank that produces a positive portion of the output current, while the lower nine (9) SCRs 202 in FIG. 2 correspond to a negative bank that produces a negative portion of the output current. An interphase transformer (IPT) 222 is provided for each of the negative bank of SCRs 202 and the positive bank of SCRs 202, due to the common output sharing of sets-of-three SCRs in each bank.

A more detailed discussion of the operation of a cycloconverter for use in a VSCF system, such as the VSCF system 200 of FIG. 2, will be provided herein. The AC cycloconverter power stage provides 65 KVA, 3-phase, 115V rms, 400 Hz AC power. The power stage is comprised of SCR modules configured as nine (9) hybrid packaged full wave; 3-phase bridge circuits; six, 3-leg interphase transformer (IPT) assemblies; and three, 240 µf, 140 Vrms filter capacitors.

A single-phase cycloconverter includes two phase-controlled rectifier banks, each comprised of nine rectifiers (SCRs) and an interphase transformer (IPT). Three such cycloconverters, connected to one generator, are required for a 3-phase power output. The two phase-controlled rectifier banks, namely, the positive bank and the negative bank, alternately supply the positive and negative halves of the output current wave. An LC filter at the output of the cycloconverter attenuates the rectifier ripple-frequency components.

Figure 4:
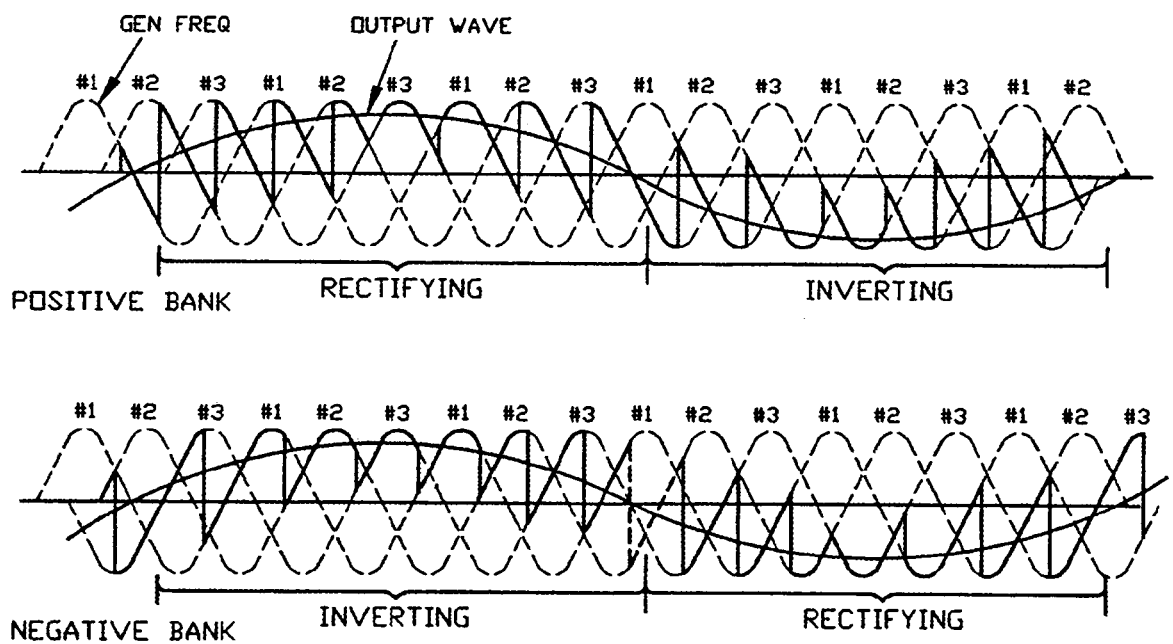
FIG. 4 is a diagram showing the gating of positive and negative rectifier banks in a cycloconverter used in a conventional VSCF system.

The gating of the positive and the negative rectifier banks is shown in FIG. 4. The solid jagged lines show the conduction period of the rectifiers connected to the various high frequency lines. These are the unfiltered outputs of the positive and the negative rectifier banks. The heavy smooth lines are the filtered output of the cycloconverter and are a replica of the reference wave at a higher power level. Note that both rectifier banks are programmed to gate over the entire 360 degrees of the output voltage wave and each bank can supply either polarity of voltage. The positive half of the output voltage wave may be formed by operating either the positive bank in the rectifying mode or the negative bank in the inverting mode, and conversely for the negative half of the voltage wave. The directions of power flow define the rectifying and inverting modes. Power flows toward the load in the rectifying mode and toward the source in the inverting mode. The point of switching banks occurs where the current goes through zero and depends upon the load power factor. The switching is natural, i.e. the load determines it, and no additional circuitry is required.

The two output voltage waves in FIG. 4 are shown to be identical, i.e., the filtered output voltage of the negative bank is equal to magnitude and phase to the filtered output voltage of the positive bank. When the rectifier banks are programmed in this manner, no distortion is produced when the load current is transferred from one bank to the other. The output voltages of the two banks are separated to block a circulating current that could otherwise flow between the positive and negative banks. This separation is called "safety-distance", and it causes slight distortion.

Figure 5:
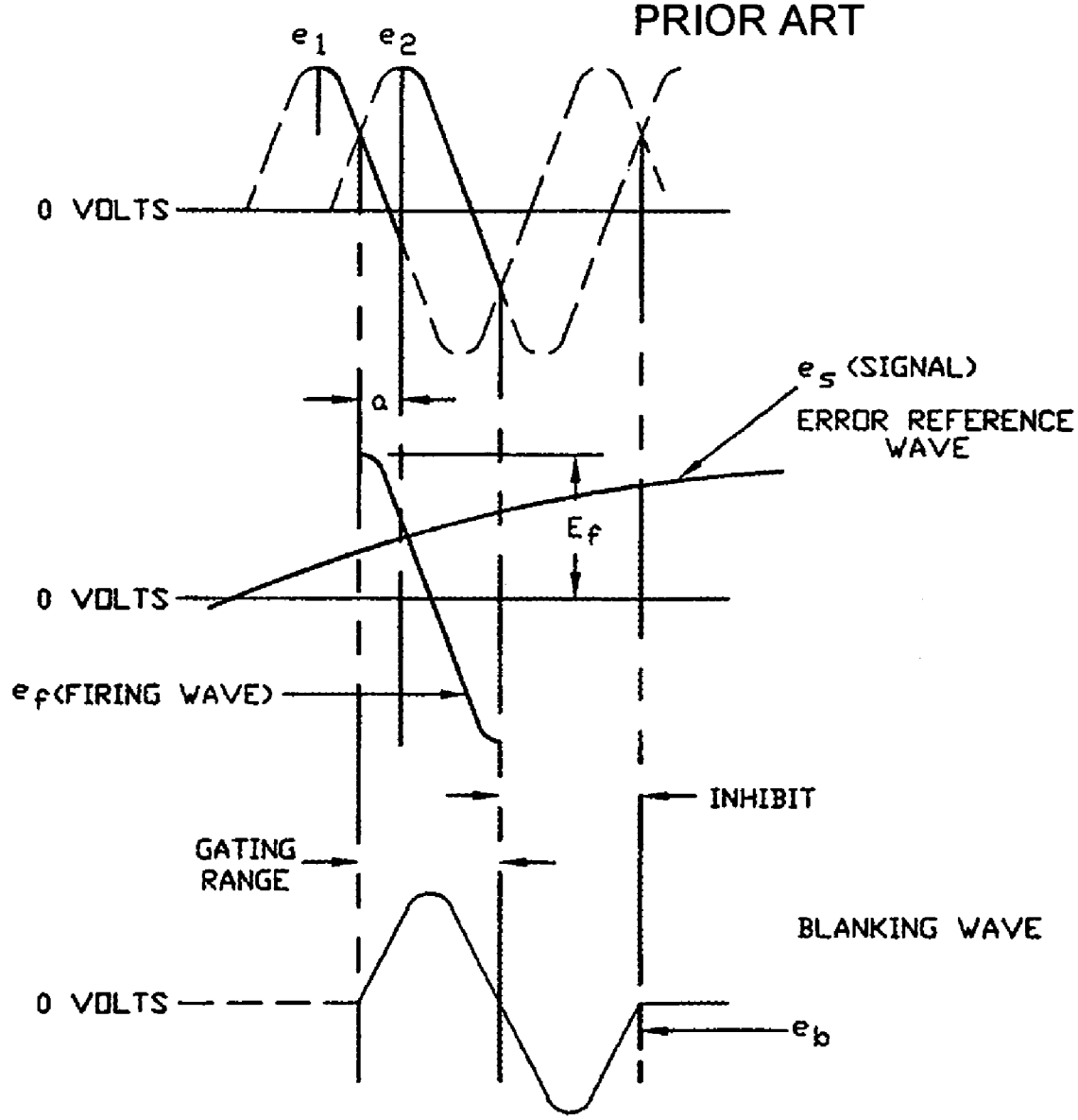
FIG. 5 is a diagram showing the comparison of a signal voltage and a firing wave voltage, for gating rectifiers in a cycloconverter used in a conventional VSCF system.

The output voltage, $e_d$, is made a linear function of a signal voltage, $e_s$, by comparing the signal voltage with a firing wave voltage, $e_f$, which is the integral of the generated line-to-line voltage. This comparison is shown in FIG. 5. The signals are those required to gate the SCRs 202.

Figure 6:
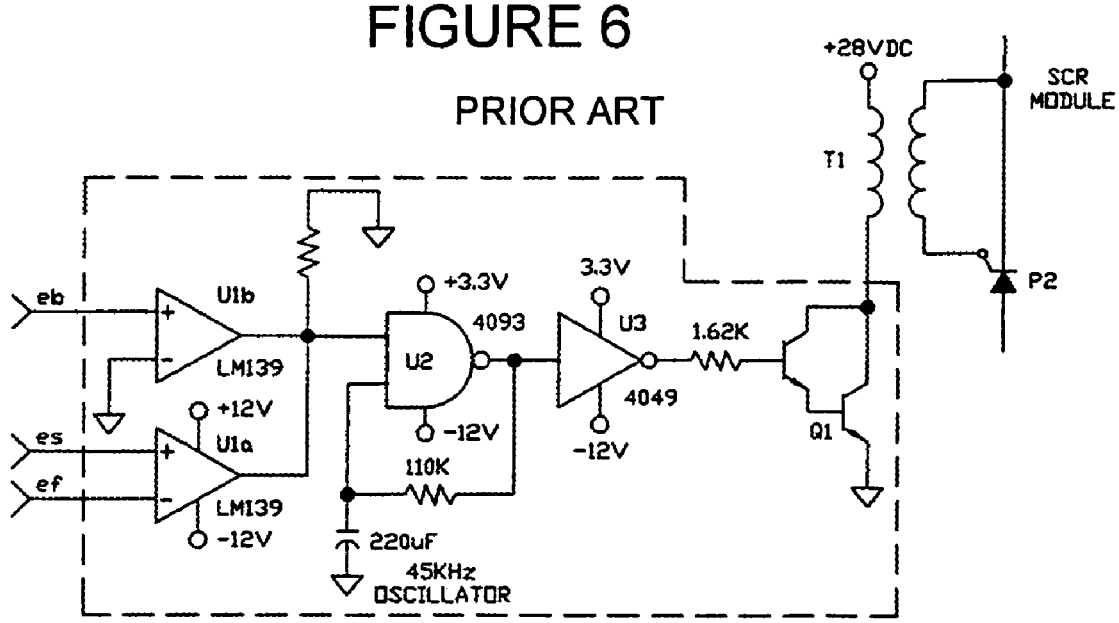
FIG. 6 is a circuit diagram showing one possible implementation of a modulator unit for a conventional VSCF system.

FIG. 6 shows one possible circuit implementation of the modulator unit 265. The modulator unit 265 includes a comparator, which operates as a sensitive voltage level detector that switches positive as the sum of the input waves go through zero in the positive direction. The modulator unit 265 also includes an oscillator that is enabled when the output of the comparator goes positive (for example, in the case where the comparator has an open collector output). Transistor Q1 and the pulse transformer T1 supply a burst of gating pulses to the respective SCR (shown as SCR P2 in FIG. 6), and amplify the output of the oscillator. The blanking voltage, $e_b$, inhibits the oscillator during the interval from $\alpha=180°$ to $\alpha=360°$ so the respective SCR is not to be gated when the voltage from anode to cathode is negative.

Figure 7:
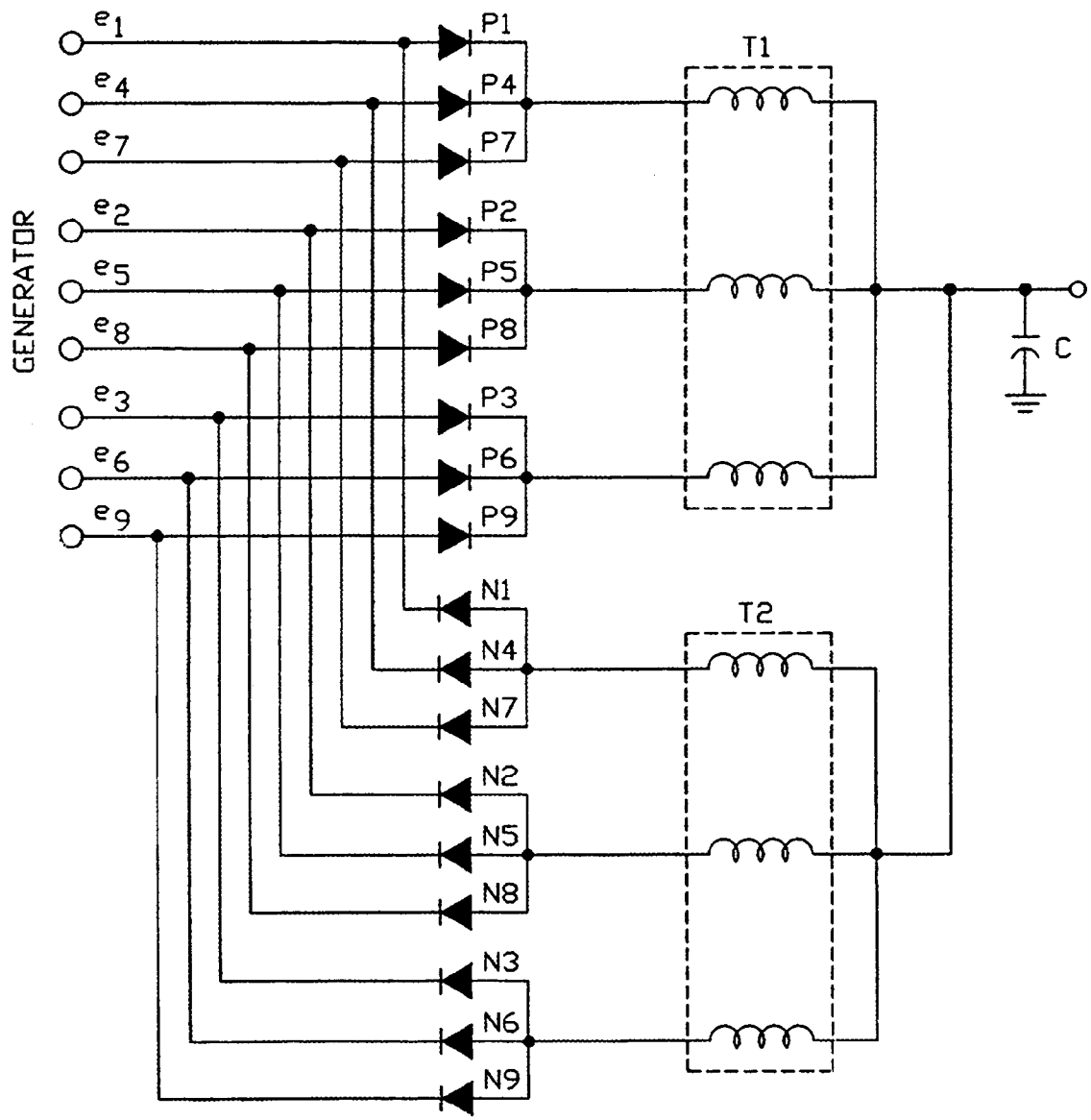
FIG. 7 is a diagram showing a 9-phase rectifier with an interphase transformer used for a conventional VSCF system.

The cycloconverter provided in the VSCF system 200 includes a 9-phase rectifier P1–P9, N1–N9 with interphase transformers T1, T2, as shown in FIG. 7. The 9-phase rectifier P1–P9, N1–N9 with the interphase transformers T1, T2 is essentially three 3-phase circuits connected in parallel. The three rectifier circuits are displaced 40° to give 9-phase ripple. The interphase transformers T1, T2 absorb the difference in the instantaneous outputs of the three rectifiers. Since the three 3-phase rectifiers are shifted 40°, a 9-phase generator is utilized. Each rectifier supplies one third of the output current so that the current in the feeders is one third that of the 3-phase connection.

For the VSCF system 200 of FIG. 2, the voltage difference between the output terminal of the phase and the neutral is 115 VAC. The DC feedback unit 272, the zero sequence feedback unit 273, the waveshaping feedback unit 276, the third harmonic feedback unit 277, and the overload and unbalance detection unit 278 are feedbacks for the inner control loop of the VSCF system 200, and are used to optimize the power quality of the output voltage and current. These feedback units are not described herein in detail, since they are known in the aircraft power systems art and also since they are not utilized in the AC-DC converter according to the first embodiment of the present invention.

Also, the generator voltage regulator unit 251 and the generator overcurrent protection unit 254 are standard units that are known in the aircraft power systems art, and thus a detailed description of those units is not provided herein for the sake of brevity.

Built-in-test and protections (not shown) for the components of the VSCF system 200 can be realized by analog circuitry and/or by a programmable logic device (PLD), or by other types of test and protection circuitry as known by those skilled in the aircraft power systems art.

The reference voltage unit Vr 242 provides the reference voltage magnitude waveform Vr, which is compared to the actual measured voltage (passed through the capacitive filter 280, then passed through the 400 Hz current transformer 285, and then fed back via a feedback path), in order to obtain an error signal. The error signal corresponds to the measured voltage of the VSCF 200 system that is subtracted from the reference voltage Vr, by way of subtractor 244. The error signal is amplified by error amplifier 246, and then the amplified signal is provided to waveform generator unit 248, which outputs a 400 Hz waveform.

The 400 Hz waveform is mixed, in a mixer amplifier 252, with a dc feedback signal (output by dc feedback unit 272), a zero sequence feedback signal (output by the zero sequence feedback unit 273), a wave shaping feedback signal (output by the wave shaping feedback unit 276), and a third harmonic feedback signal (output by the third harmonic feedback unit 278, whereby the wave shaping feedback unit 276 and the third harmonic feedback unit 277 receive a filtered version of the output power signal of the VSCF system 200, by way of the overload and unbalance detection unit 278). The feedback signals and the error signal are added by way of an adder 282, and the output of the adder 282 is provided to the mixer amplifier unit 252. This corresponds to an inner control loop of the VSCF system 200.

Also shown in FIG. 2 is a current control loop, in which a current limit value Ir output by a current limiter unit 284 is compared with the measured output current output of the VSCF system 200 by way of a subtractor 286, in order to obtain a current error signal. The current error signal is amplified by an error amplifier 288, and provided as a current error value, to the subtractor 244, by way of a diode 289. The current loop protects against short circuits, and ensures that the output current value does not exceed a predetermined peak current value Ir.

The mixed signal es output by the mixer amplifier 252 corresponds to the reference waveform es, and it is compared with the firing waveform ef in the modulator unit 265 to determine which of the SCRs 202 to turn on and off and for how long.

The high frequency current transformer unit 232 obtains a high frequency current measurement of the variable frequency output of the MG 288c. This is typically performed by reducing the current to a fraction of its value (e.g., $\frac{1}{100}^{th}$ of its value), and measuring the fractional current across a resistor.

The variable frequency generation sensing and voltage suppressor unit 234 senses the output voltage values of the MG 288c, and also provides a voltage suppression function to ensure that the voltage provided to the SCRs 202 does not exceed a predetermined value. The voltage suppression function may be accomplished by way of a zener diode, for example.

The firing and blanking waveform generator unit 236 receives the measured voltage and current of the output of the generator 288c, as provided to it by the high frequency current transformer unit 232 and the variable frequency generation sensing and voltage suppression unit 234. The firing and blanking waveform generator unit 236 integrates those measured values, and determines a firing waveform ef and a blanking waveform eb, in a manner known to those skilled in the art. The blanking waveform eb is used to block some of the SCRs 202 from firing at certain times.

The modulator unit 265 receives both the firing waveform ef and the blanking waveform eb output by the firing and blanking waveform generator unit 236, as well as the reference voltage waveform es output by the mixer amplifier 252.

The modulator unit 265 generates a modulated signal, which is provided to the SCR driver unit 270. The modulator unit 265 operates as a high-frequency switch (e.g., it performs 50 kHz switching), and detects zero crossings in order to determine when to switch each of the SCRs 202. Based on the modulated signal provided to the SCR driver unit 270, the SCR driver unit 270 provides SCR driving signals to the SCRs 202. In particular, the SCR driving signals are respectively provided to the gate inputs of the SCRs 202.

Figure 3:
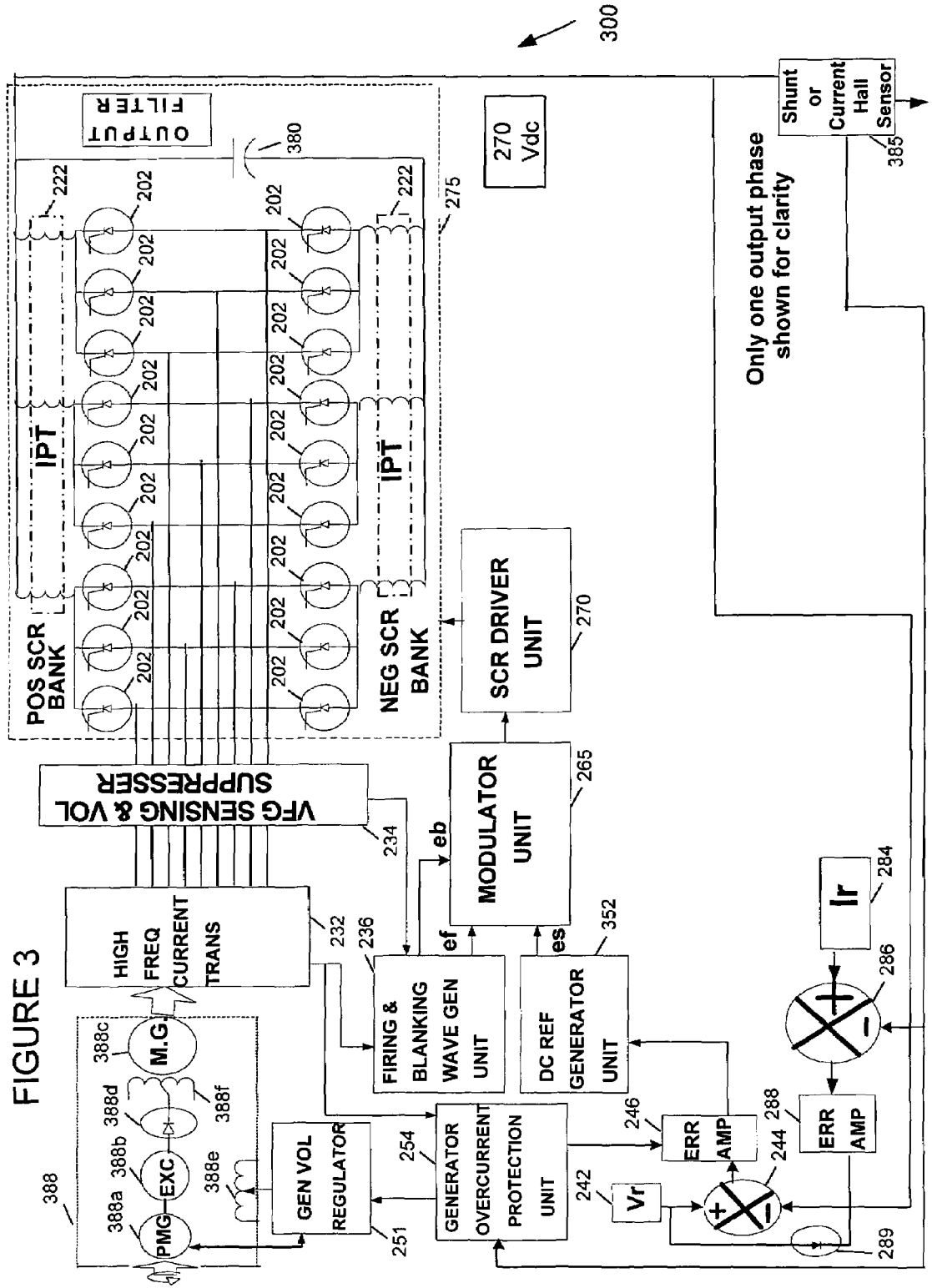
FIG. 3 is a block diagram of an AC-DC converter according to a first embodiment of the invention.

Now, explanation of the AC-DC converter according to the first embodiment of the invention will be described below, with reference to FIG. 3. The modifications of a conventional VSCF system, such as the ones shown in FIGS. 1 and 2, in order to obtain an AC-DC converter 300 as shown in FIG. 3, will be described below. None of these modifications is major, and it is contemplated that an AC-DC converter according to the first embodiment can be fairly readily manufactured from a conventional VSCF system such as the VSCF system 200 shown in block diagram form in FIG. 2.

Some of the differences between the VSCF 200 as shown in FIG. 2 and the AC-DC converter 300 according to the first embodiment and as shown in FIG. 3 are detailed below: a) the output capacitive filter of the VSCF system 200 is reconnected so as to be disposed between the positive bank of SCRs and the negative bank of SCRs in the AC-DC converter system 300; b) the neutral of the generator used in the VSCF system 200 is removed from ground in the AC-DC converter system 300, c) the waveform generator unit and the mixer amplifier unit of the VSCF system 200 are replaced by a DC reference signal generator unit in the AC-DC converter system 300, d) the DC feedback unit, the zero sequence feedback unit, the third harmonic feedback unit, and the waveshaping feedback unit of the VSCF system 200 are not utilized in the AC-DC converter system 300 and consequently are removed from that system, and e) the safety distance between the positive SCR bank and the negative SCR bank in the VSCF system 200 is eliminated in the AC-DC converter system 300 to allow for full-wave rectification. With such changes, each of the three AC phases of the three separate frequency converter circuits is converted to a 270 VDC AC-to-DC converter, or to any other particular DC value that is desired (e.g., a 28 VDC converter).

In the first embodiment as described above, each of the three separate frequency converter circuits (one of which is shown in FIG. 3) has its own feedback control. In the first embodiment, each of the three separate frequency converter circuits is independently controlled, and whereby the outputs of the three separate frequency converters are connected in parallel in order to obtain a single DC power output.

As discussed in "difference point a)" above, the SCRs 202 are connected differently for the AC-DC converter system 300 of FIG. 3 as compared to how they are connected in the VSCF system 200 of FIG. 2. In FIG. 2, the positive bank of SCRs and the negative bank of SCRs are coupled together with that coupled output being provided to a filter 280, whereby the filter 280 may correspond to a capacitive element or a capacitive element and an inductive element. In the AC/DC converter 300 of FIG. 3, however, the positive bank of SCRs 202 and the negative bank of SCRs 202 are not coupled together at their output, but rather they are separated from each other by way of a capacitor 380. In particular, the negative bank of SCRs is connected to one end of the capacitor 380 and the positive bank of SCRs are connected to the other end of the capacitor 380. Thus, for the AC-DC converter system 300 as modified from the VSCF system 200, the positive and negative banks of SCRs 202 are disconnected from each other, with a capacitive element placed therebetween.

As discussed in "difference point e)" above, a "safety mechanism" for the positive bank of SCRs 202 and the negative bank of SCRs 202 as provided in the VSCF system 200 of FIG. 2, is not utilized in the AC/DC converter system 300 of FIG. 3. The safety mechanism is used in the VSCF system 200 to stop the positive and negative banks of SCRs from turning on at the same time. However, since the turning on of the positive and negative banks of SCRs is desired for the AC/DC converter system 300 of FIG. 3, since a full wave rectified output is what is obtained in the AC/DC converter 300, the safety mechanism used in the VSCF system 200 is not implemented in the AC/DC converter 300.

Figure 8:
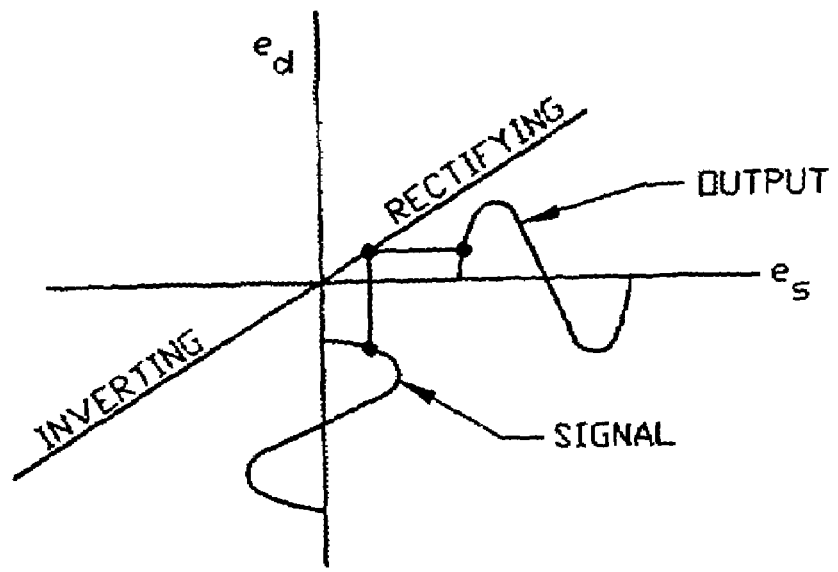
FIG. 8 is a diagram showing the control characteristics of a positive rectifier bank for a conventional VSCF system.

In more detail, referring now to FIG. 8, the control characteristics of the positive rectifier bank for the VSCF system 200 are shown in that figure, whereby the first quadrant is the rectifying mode and the third quadrant is the inverting mode. The control characteristics for the negative bank is similar to that shown in FIG. 8, except that the quadrants are reversed.

Figure 9:
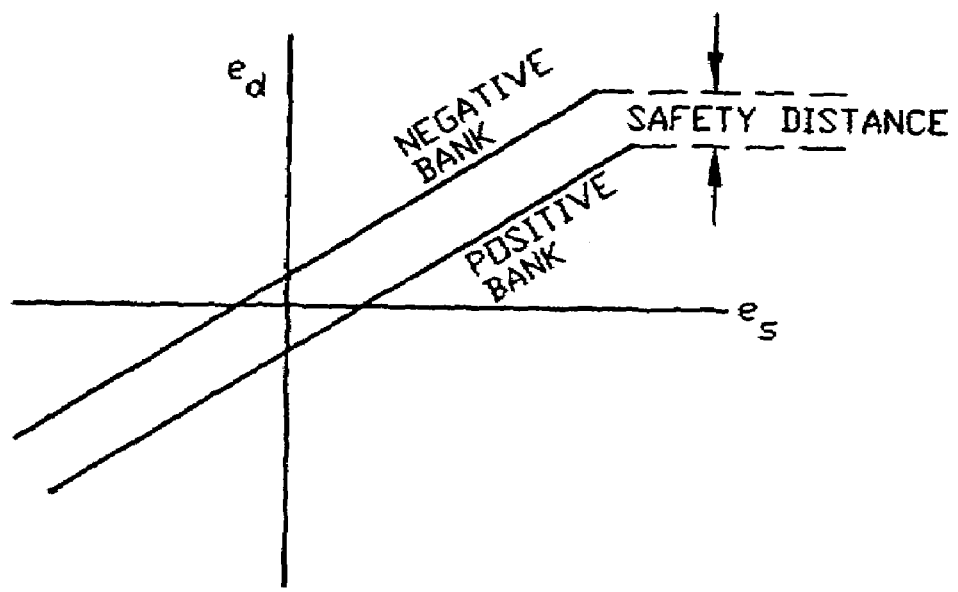
FIG. 9 is a diagram showing the safety distance utilized in a conventional VSCF system.

The control characteristics are typically not exactly as shown in FIG. 8 due to a circulating current in the cycloconverter. If the voltage of the positive bank of SCRs were more positive than that of the negative bank of SCRs, a large DC current would flow from the positive bank to the negative bank whose magnitude would be limited only by the resistance of the generator and reactor windings of the generator and reactor windings. In the VSCF system 200 of FIG. 2, the dc current is blocked by ensuring that the negative rectifier bank voltage is always more positive than the positive rectifier bank voltage, as shown in FIG. 9. This offset in the control characteristics is called the "safety distance" and is obtained by adding a dc bias to the 400 Hz signal waves in the modulators. No such offset is needed for the AC-DC converter system 300 of the first embodiment.

Figure 10:
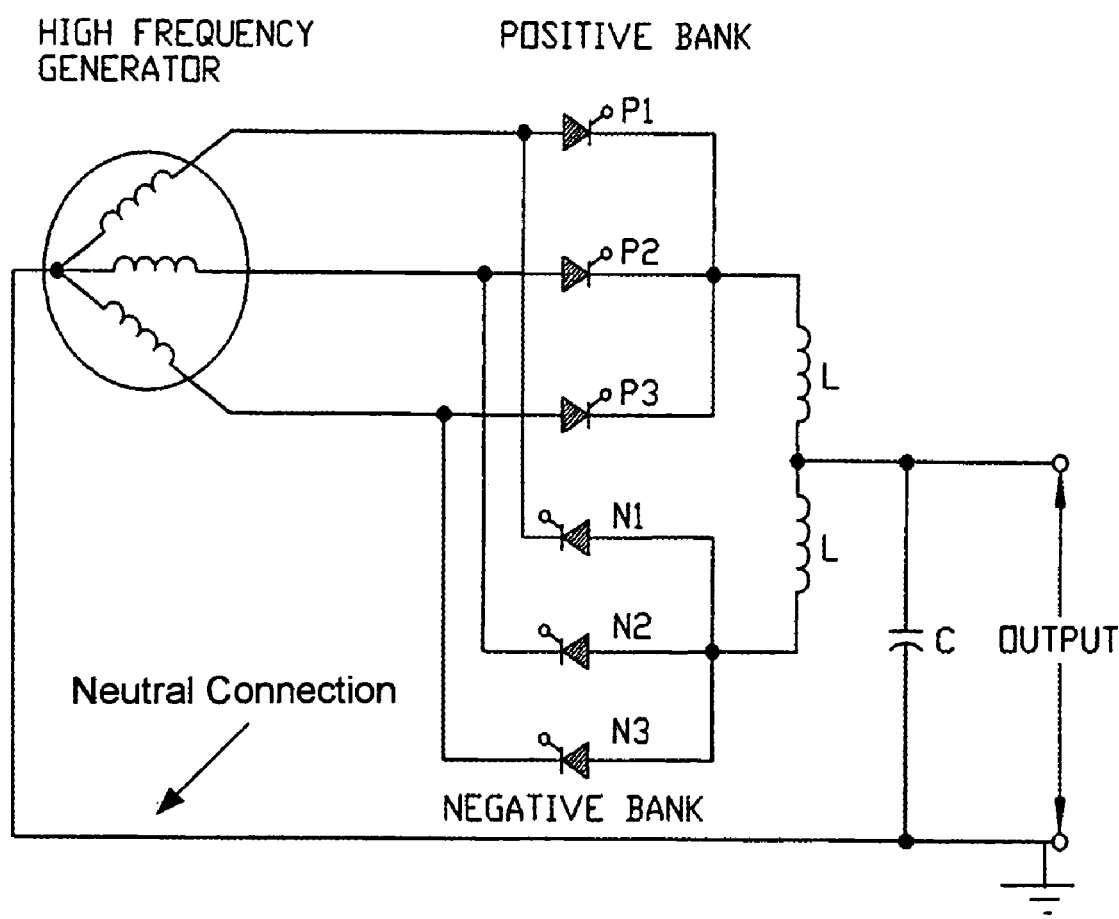
FIG. 10 is a diagram showing the neutral connection of the generation to ground in a conventional VSCF system.

As discussed in "difference point b)" above, for the AC-DC converter system 300 of FIG. 3, the neutral of the generator is not connected to ground, whereby the neutral of the generator of the VSCF system 200 of FIG. 2 is connected to ground. FIG. 10 shows the neutral connection of the generator 288 for the VSCF system 200, which is coupled to ground. In the AC-DC converter 300, in contrast, the neutral wire of the generator 388 is removed (the neutral point will still exist).

As discussed in "difference point c)" above, for the AC/DC converter system 300 of FIG. 3, a DC reference voltage generator unit 352 is utilized, whereby no such unit is provided in the VSCF system 200 of FIG. 2. For the AC/DC converter 300 of FIG. 3, the reference magnitude waveform Vr is still compared to the output voltage of the AC/DC converter 300, by way of a subtractor 244, but since this error value is already a DC waveform, there is no need to have a mixer amplifier unit 252 or a waveform generator unit 248 that are required to obtain an AC waveform in the VSCF system 200 of FIG. 2.

Figure 11:
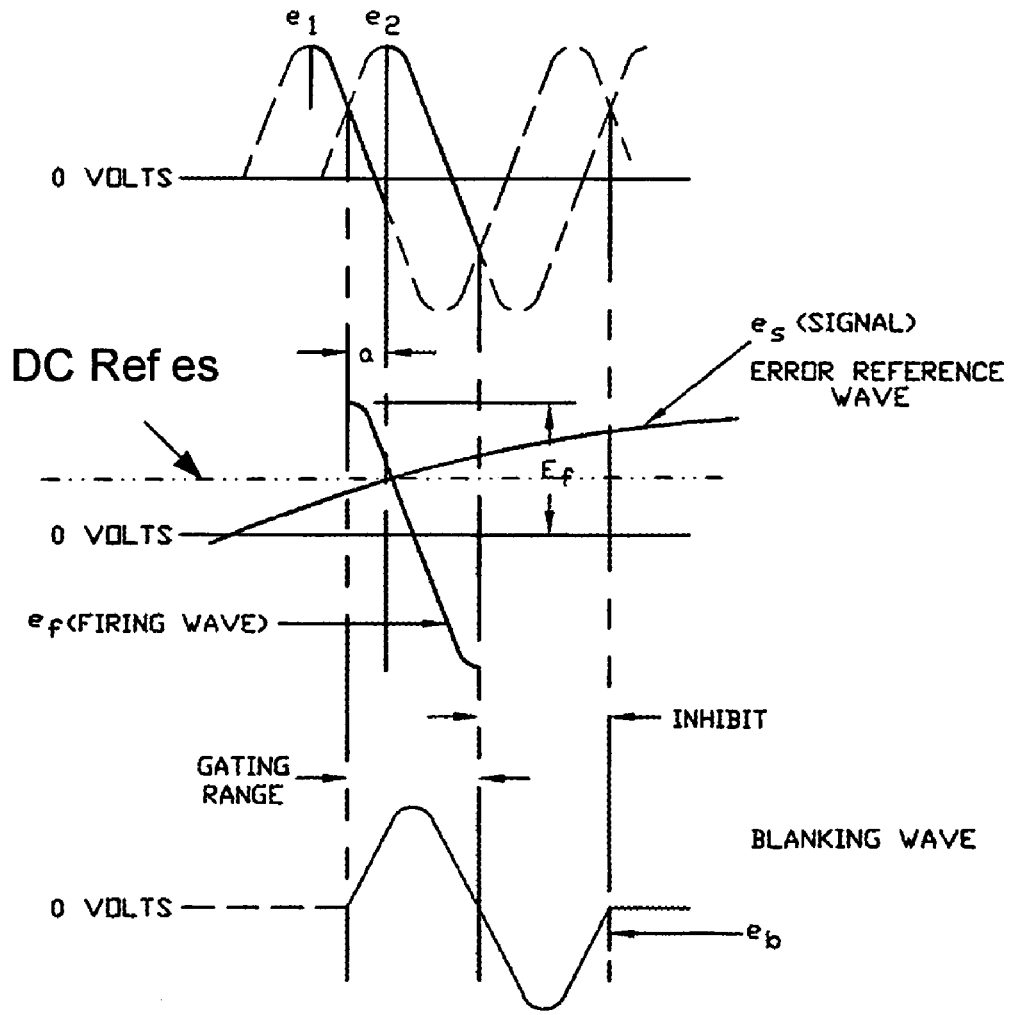
FIG. 11 is a diagram showing a DC reference waveform that is utilized in an AC-DC converter according to the first embodiment.

In more detail, as illustrated in FIG. 11, in the case of AC-to-AC cycloconverter 275 of FIG. 2, the reference wave signal es is a sinusoidal waveform, while in the case of the AC-DC converter 300 according to the first embodiment, the reference waveform is a DC waveform that is the output of the DC reference generator unit 352 of FIG. 3. The DC reference waveform is indicated with text, DC Ref $e_s$, in the FIG. 11. By way of example and not by way of limitation, in a preferred construction of the first embodiment, the magnitude of firing and blanking waveforms ef and eb is about 4.67V, whereby other values may be contemplated by those skilled in the art while remaining within the scope of the invention. By way of example and not by way of limitation, the DC Ref $e_s$ is from 3.0V to 4.2V under load conditions and 1V under no load condition, where again other ranges may be contemplated by those skilled in the art while remaining within the scope of the invention.

Figure 12:
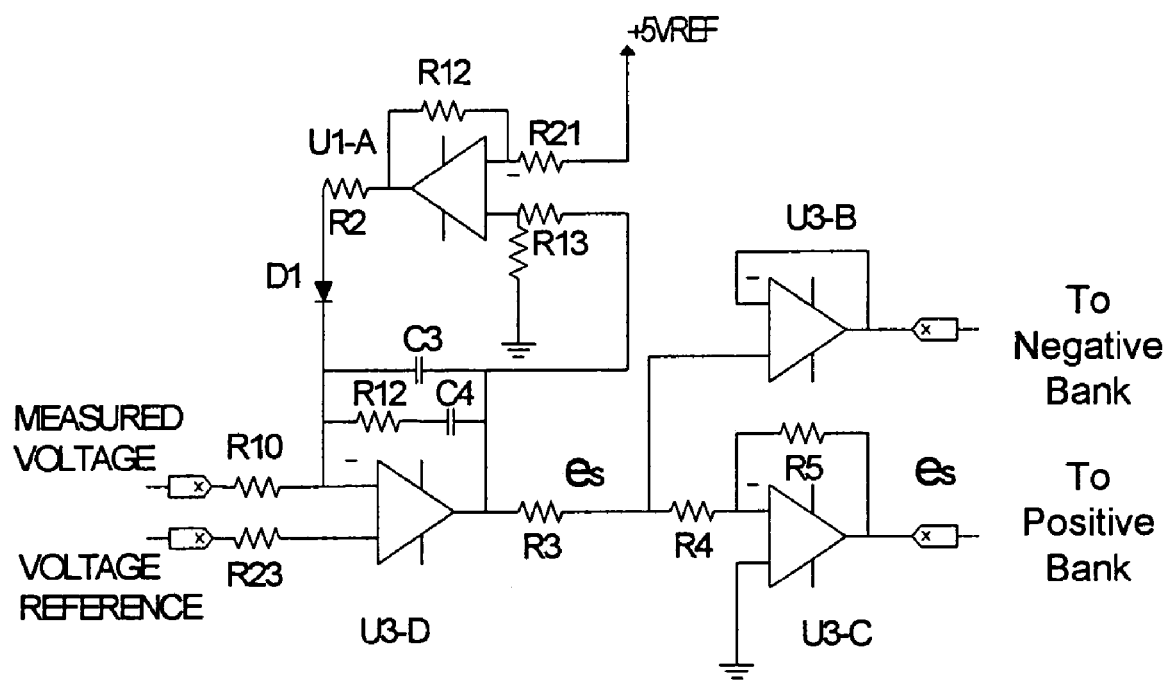
FIG. 12 is a circuit diagram showing one possible implementation of a DC reference generator unit utilized in the AC-DC converter according to the first embodiment.

FIG. 12 shows one possible circuit construction of the DC reference generator unit 352, the error amplifier 246 and the adder 244 of the AC/DC Converter 300 of FIG. 3. Op-Amp U3-D with capacitors C3, C4, and with resistors R12, R10, R3 and R23 is the circuit that provides the functions of the reference generator unit 352, the error amplifier 246 and the adder 244. Op-Amp U1-A with resistors R12, R21, R13, R2 and diode D1 operates as a voltage limiter that prevents the signal $e_s$ from going out of range.

Also, as discussed in "difference point d)" above, the feedback control loop of the AC/DC converter 300 is simplified as compared to the feedback control loop of the VSCF system 200, which saves on power requirements, size requirements, and manufacturing costs. In more detail, the DC feedback unit, the zero sequence feedback unit, the third harmonic feedback unit, and the waveshaping feedback unit of the VSCF system 200 are not utilized in the feedback control loop of the AC-DC converter 300.

Another difference between the VSCF system 200 and the AC-DC converter 300 is that a shunt or current Hall sensor 385 is provided at an output of the AC-DC converter 300, while a 400 Hz current transformer is provided at an output of the VSCF system 200.

In the first embodiment, there are three sets of the components shown in FIG. 3, whereby each of the frequency converter circuits is independent controlled by its own control circuitry.

In a second embodiment of an AC/DC converter, each of the three separate frequency converter circuits has its own set of SCRs, whereby the gating pulses provided to those three sets of SCRs are provided by way of a single gating pulse generation circuit that is shared among the three frequency converter circuits. This ensures precise synchronization among the three sets of SCRs, since they are being controlled by a single control system.

In the second embodiment, referring again to FIG. 3, there are three separate sets of 18 SCRs (like in the first embodiment), each of which being driven by pulses provided by way of a single SCR driver unit 270 (under control of a single modulator unit 270) that is used by all three frequency converter circuits. The outputs of these three sets of 18 SCRs are paralleled together, to provide a single output for an AC-DC converter according to the second embodiment.

As compared to conventional aircraft AC/DC converters, the power factor of the AC/DC converter according to the first and second embodiments is higher, whereby the power factor of the main generator output is approximately 0.95. This allows significant reduction in the resistance per phase of the main stator of the generator unit by increasing the number of wires in hand and reducing the number of turns per phase with the same slot fill factor. Also, the reduction in resistance as compared to a VSCF system is approximately 44%, which permits the raising of the power rating. The increase of the continuous power rating is limited by the junction temperatures of the SCRs that are the same that are used for a VSCF system. The power rating of the AC/DC converter according to the first and second embodiments is estimated to be about 80 kW.

The AC/DC converter according to the first and second embodiments generates very low ripple and harmonic distortion, as compared to conventional AC/D converters. Also, the AC/DC converter according to the first and second embodiments offer excellent load-on and load-off transient capability as compared to conventional aircraft AC/DC converters.

Some conventional aircraft AC/DC converters used a diode bridge instead of SCRs, whereby a large dynamic brake (that is not needed in the first or second embodiments) is required to handle transients. Also, the conventional "diode bridge" AC/DC converters require a higher capacitance filter, somewhere in the range of 3000 to 5000 microfarads, which is a much costlier and heavier filter than the capacitive filter used in the present invention.

Thus, different embodiments of an aircraft AC-DC converter have been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. An AC-DC converter unit that is coupled to a generator, comprising:
   a DC reference voltage generation unit configured to create a DC reference voltage waveform based in part on a DC feedback signal;
   an SCR firing unit configured to receive a variable frequency voltage output from the generator and to provide a plurality of firing signals;
   a plurality of SCRs including a positive bank of SCRs and a negative bank of SCRs;
   a modulator unit configured to receive the firing signals from the SCR firing unit and the DC reference voltage waveform, and to respectively output a plurality of modulated signals;
   an SCR driver unit configured to output SCR gate signals to the plurality of SCRs based on the plurality of modulated signals output by the modulator unit, wherein an output of the plurality of SCRs corresponds to a rectified voltage waveform;
   a filter unit connected directly between the positive and negative banks of SCRs such that respective outputs of the positive and negative banks of SCRs are not directly connected to each other, the filter unit configured to filter the rectified voltage waveform to provide a filtered rectified voltage waveform as a DC output voltage of the AC-DC converter; and
   a voltage feedback path for feeding back the DC output voltage as the DC feedback signal,
   wherein the modulator unit directly receives the DC reference voltage waveform, as a DC voltage value, output by the DC reference voltage generation unit, and wherein the modulator unit modulates the DC reference voltage waveform with the firing signals output by the SCR firing unit.

2. The AC-DC converter according to claim 1, further comprising a subtractor, wherein the subtractor subtracts a DC feedback voltage corresponding to the feedback signal from a DC reference voltage to obtain a subtracted output, and wherein the subtracted output is provided to the DC reference voltage generation unit.

3. The AC-DC converter according to claim 2, further comprising an amplifier unit configured to amplify the subtracted output by a predetermined amount up to an upper limit value, as an amplified/limited voltage waveform, and wherein the amplified/limited voltage waveform is provided to the DC reference voltage generation unit.

4. The AC-DC converter according to claim 1, wherein each of the plurality of SCRs includes an anode, a cathode, and a gate, and
   wherein the modulator unit outputs the plurality of SCR gate signals to the gates of the plurality of SCRs, respectively.

5. The AC-DC converter according to claim 1, wherein a number of SCRs is one of 6, 12 and 18.

6. The AC-DC converter according to claim 2, further comprising:
   a reference current unit configured to output a reference current value;
   a current sensor configured to sense an output current of the DC feedback signal; and
   a second subtractor configured to subtract the sensed output current from the reference current value as a second subtracted output, and to provide the second subtracted output to a cathode end of a diode connected between a DC reference voltage unit and the subtractor,
   wherein the DC reference voltage unit outputs the DC reference voltage.

7. The AC-DC converter according to claim 3, further comprising:
   a reference current unit configured to output a reference current value;
   a current sensor configured to sense an output current of the DC feedback signal; and
   a second subtractor configured to subtract the sensed output current from the reference current value as a second subtracted output, and to provide the second subtracted output to a cathode end of a diode connected between a DC reference voltage unit and the subtractor, for current limiting,
   wherein the DC reference voltage unit outputs the DC reference voltage.

8. The AC-DC converter according to claim 1, wherein the generator comprises:
   a permanent magnetic generator;
   an exciter; and
   a main generator.

9. The AC-DC converter according to claim 8, wherein a neutral of the main generator is not coupled to ground.

10. The AC-DC converter according to claim 8, wherein the permanent magnetic generator is coupled to a rotating unit.

11. An AC-DC converter unit that is coupled to a generator, comprising:
 DC reference voltage generation means for generating a DC reference voltage waveform based in part on a DC feedback signal;
 SCR firing means that receives a variable frequency power output from the generator and that provides a plurality of firing signals;
 a plurality of SCRs including a positive bank of SCRs and a negative bank of SCRs;
 modulator means for receiving the firing signals from the SCR firing means and the DC reference voltage waveform, and that outputs a plurality of modulated signals;
 SCR firing means for outputting a plurality of SCR gate signals to the plurality of SCRs based on the plurality of modulated signals output by the modulator means;
 filter means connected directly between the positive and negative banks of SCRs such that respective outputs of the positive and negative banks of SCRs are not directly connected to each other, the filter means filtering an output of the SCRs to provide a filtered rectified voltage waveform as a DC output voltage of the AC-DC converter; and
 feedback means for feeding back the DC output voltage as the DC feedback signal,
 wherein the modulator means directly receives the DC reference voltage waveform, as a DC voltage value, output by the DC reference voltage generation means, and wherein the modulator unit modulates the DC reference voltage waveform with the firing signals output by the SCR firing means.

12. The AC-DC converter according to claim 11, further comprising subtracting means for subtracting a feedback voltage corresponding to the feedback signal from a DC reference voltage to obtain a subtracted output, and wherein the subtracted output is provided to the DC reference voltage generation means.

13. The AC-DC converter according to claim 12, further comprising amplifying means for amplifying the subtracted output by a predetermined amount up to an upper limit value, as an amplified/limited voltage waveform, and wherein the amplified/limited voltage waveform is provided to the DC reference voltage generation means.

14. The AC-DC converter according to claim 11, wherein each of the plurality of SCRs includes an anode, a cathode, and a gate, and
 wherein the modulator means outputs the plurality of SCR gate signals to the gates of the plurality of SCRs, respectively.

15. The AC-DC converter according to claim 11, wherein a number of SCRs is one of 6, 12 and 18.

16. The AC-DC converter according to claim 12, further comprising:
 reference current means for generating and outputting a reference current value;
 current sensor means for sensing an output current of the filter means; and
 second subtracting means for subtracting the sensed output current from the reference current value as a second subtracted output, and for providing the second subtracted output to a cathode end of a diode connected between a DC reference voltage means and the subtracting means,
 wherein the DC reference voltage means outputs the DC reference voltage.

17. The AC-DC converter according to claim 13, further comprising:
 reference current means for generating and outputting a reference current value;
 current sensor means for sensing an output current of the capacitor; and
 second subtracting means for subtracting the sensed output current from the reference current value as a second subtracted output, and for providing the second subtracted output to a cathode end of a diode connected between a DC reference voltage means and the subtracting means,
 wherein the DC reference voltage means outputs the DC reference voltage.

18. The AC-DC converter according to claim 11, wherein the generator comprises:
 a permanent magnetic generator;
 an exciter; and
 a main generator.

19. The AC-DC converter according to claim 18, wherein a neutral of the main generator is not coupled to ground.

20. The AC-DC converter according to claim 18, wherein the permanent magnetic generator is coupled to a rotating unit.

21. The AC-DC converter according to claim 20, wherein the rotating unit is an aircraft engine.

22. An AC-DC converter unit that is coupled to a generator, comprising:
 a cycloconverter that receives a multi-phase output of the generator, wherein the cycloconverter includes:
  a plurality of rectifiers provided as a positive bank of rectifiers and a negative bank of rectifiers, and
  a capacitive element coupled directly between the positive and the negative banks of rectifiers such that respective outputs of the positive and negative banks of rectifiers are not directly connected to each other;
 a DC reference waveform generation unit that generates a DC reference voltage waveform;
 a feedback path that provides a DC voltage output of the AC-DC converter unit that is utilized by the DC reference waveform generation unit to generate the DC reference voltage waveform;
 a modulator unit configured to receive the DC reference voltage waveform and to output a plurality of rectifier gate signals; and
 a rectifier firing unit that provides a plurality of firing signals to the plurality of rectifiers based on the plurality of rectifier gate signals output by the modulator unit.

23. A method of converting a variable speed constant frequency (VSCF) system to an AC/DC converter, the VSCF system including a generator unit, a cycloconverter unit having a positive bank of SCRs and a negative bank of SCRs with an output filter coupled to an output point at which the positive and negative banks of SCRs are connected to each other, the method comprising:
 obtaining a DC voltage waveform from a DC feedback signal and a reference DC voltage;
 receiving a variable frequency voltage output from the generator unit;

modulating the DC reference voltage with a plurality of firing signals that correspond to the variable frequency voltage, in order to obtain SCR firing signals; and providing the plurality of firing wave signals to the plurality of SCRs to thereby obtain a DC voltage.

24. The method according to claim 23, wherein the generator unit of the VSCF system has a neutral connection coupled to ground, the method comprising:

disconnecting the neutral connection of the generator unit from ground.

25. The AC-DC converter according to claim 1, wherein the feedback path only feeds back DC waveforms and wherein the feedback path does not include any current transformers.

26. The AC-DC converter according to claim 11, wherein the feedback means only feeds back DC waveforms and wherein the feedback means does not include any current transformers.

* * * * *